(12) United States Patent
Fantone et al.

(10) Patent No.: US 7,064,327 B2
(45) Date of Patent: Jun. 20, 2006

(54) NIGHT VISION APPARATUS

(75) Inventors: Stephen D. Fantone, Lynnfield, MA (US); Daniel Orband, Lynn, MA (US)

(73) Assignee: Optikos Corporation, Cambridge, MA (US)

( * ) Notice: Subject to any disclaimer, the term of this patent is extended or adjusted under 35 U.S.C. 154(b) by 235 days.

(21) Appl. No.: 10/728,392

(22) Filed: Dec. 5, 2003

(65) Prior Publication Data

US 2005/0092923 A1 May 5, 2005

Related U.S. Application Data

(60) Provisional application No. 60/434,081, filed on Dec. 17, 2002.

(51) Int. Cl.
*H01L 31/00* (2006.01)
(52) U.S. Cl. .................................... 250/330
(58) Field of Classification Search ............... 250/330, 250/332
See application file for complete search history.

(56) References Cited

U.S. PATENT DOCUMENTS

| | | | | |
|---|---|---|---|---|
| 4,463,252 A | * | 7/1984 | Brennan et al. ...... | 250/214 VT |
| 4,915,478 A | * | 4/1990 | Lenko et al. ................. | 349/65 |
| 6,419,372 B1 | * | 7/2002 | Shaw et al. .................. | 362/231 |
| 6,486,473 B1 | * | 11/2002 | Salapow et al. ............ | 250/330 |
| 2002/0167589 A1 | * | 11/2002 | Schofield et al. ........... | 348/148 |
| 2003/0015662 A1 | * | 1/2003 | Yang et al. ................. | 250/330 |
| 2004/0008157 A1 | * | 1/2004 | Brubaker et al. .............. | 345/8 |
| 2004/0136605 A1 | * | 7/2004 | Seger et al. ................. | 382/274 |

OTHER PUBLICATIONS

Shanker, T., (Dec. 1, 2001). "How it Works: The Edge of Night", *The New York Times*, Section 6, p. 44, col. 1. (Downloaded text version enclosed).

* cited by examiner

*Primary Examiner*—David Porta
*Assistant Examiner*—Christopher Webb
(74) *Attorney, Agent, or Firm*—Francis J. Caufield (57) ABSTRACT

A night vision apparatus comprises housing arrangement by which a user can place an eyepiece adjacent one eye, a solid state imager sensitive to infrared radiation, an infrared radiation generation means arranged to generate infrared radiation into the field of view of the solid state imager; and an image generator arranged to receive the output from the solid state imager and to generate a visible image representative of this output at a position visible to the eye of the user. Head-mounted and hand-held embodiments are provided.

17 Claims, 7 Drawing Sheets

NIGHT VISION APPARATUS

CROSS REFERENCE TO RELATED APPLICATION

This application claims the benefit of priority from U.S. Provisional Patent Application No. 60/434,081 filed on Dec. 17, 2002 in the name of Stephen D. Fantone, et al. with the title NIGHT VISION APPARATUS, the entire contents of which is incorporated herein by reference.

FIELD OF THE INVENTION

This invention relates generally to night vision apparatus and more specifically to a simple form of such apparatus which may be useful as a toy, novelty item or for observation of wild life at night.

BACKGROUND OF THE INVENTION

Night vision apparatus is a term which is used herein to mean apparatus useful for observations under conditions where there is insufficient visible light for normal visual observation and which may thus be useful in caves and other dark places as well as at night. For many years, such apparatus has been used by the military because they provide enormous tactical advantages over forces which lack them. Military night vision apparatus is typically "passive" in the sense that it relies upon infrared radiation naturally present in the environment and/or low levels of light emitted by objects being observed. Infrared night vision apparatus visualize heat given off by observed targets while passive night vision apparatus gathers low levels of available radiation and images it on to a image intensifier tube, which amplifies the low level radiation several thousand fold and presents a visible representation of the resultant amplified image to the user. Infrared passive apparatus is desirable for military use because it gives an indication of the temperature of the object being viewed, warmer objects appearing brighter than colder ones. Thus, a passive night vision apparatus can be used, for example, to reveal vehicles (and especially the hot exhaust systems thereof) against a cold ground, or warm-blooded animals against a similar cold background. Also, it is obviously undesirable for a military night vision apparatus to require emission of radiation, since any enemy equipped with a night vision system could readily detect the emissions and thus uncover the location of forces using them.

Many people have been intrigued by newscasts and other public displays of images generated by military night vision apparatus and wish to experiment with similar apparatus either simply as a novel experience or, for example, because such apparatus may be useful in observing wild life at night or under other low light conditions such as in caves without the need to generate visible light which might drive off the wild life. However, the infrared imaging detectors and image intensifier tubes used in military systems are very expensive; even in mass production, the standard night vision image intensifier apparatus used by U.S. infantry forces costs about $3500 per unit, which is prohibitive for most civilian applications. Furthermore, because military apparatus designed to detect radiation emitted from objects not greatly above ambient temperature (at say 40° C.), the apparatus is designed to be sensitive to far infrared radiation having wavelengths above about 2000 nm. Images generated using such far infrared radiation are so different from images of the same scene in visible light that specialized training is typically needed to enable military personnel to perform tasks such as driving vehicles while using night vision apparatus.

Accordingly, there is a need for an inexpensive night vision apparatus which can be used safely by the general public without the need for specialized training. Desirably, such apparatus should be compact, have sufficiently low power requirements that it can be operated from batteries, and produce images based upon visual properties of the environment such that the images are easy for even inexperienced operators to interpret. It is a primary object of this invention to fulfil this need.

It is a further object of this invention to provide such apparatus which does not emit substantial amounts of visible radiation.

It is yet another object of this invention to provide such apparatus in head-worn and hand-held versions.

Other objects of the invention will be apparent and will appear hereinafter in the following detailed description when read in connection with the drawings.

SUMMARY OF THE INVENTION

One aspect of this invention provides a night vision apparatus comprising:

a head mounting means for mounting the apparatus on the head of a user with a portion of the apparatus adjacent an eye of the user;

a solid state imager mounted on the head mounting means and having an operating mode having substantial sensitivity to near infrared radiation, the solid state imager having a field of view;

infrared radiation generation means mounted on the head mounting means and arranged to generate infrared radiation and to direct such radiation into the field of view of the solid state imager; and image generation means mounted on the head mounting means and arranged to receive an output from the solid state imager and to generate a visible image representative of the output at a position visible to the eye of the user.

In another aspect of the invention, the apparatus is configured and arranged to be hand-held instead of head-worn; both the head-worn and hand-held versions in many repects possessing common elements.

BRIEF DESCRIPTION OF THE DRAWINGS

The structure and operation of the night vision apparatus of the present invention, together with other objects and advantages thereof, may best be understood by reading the detailed description in connection with the drawings in which unique reference numerals have been used throughout for each part and wherein:

FIG. 9A is diagrammatic perspective view of a hand-held version powered by a distant battery pack to be attached to a belt or the like;

FIG. 9B is a diagrammatic perspective view of a hand-held version of the invention in which batteries for powering it are carried in housing extensions that also serve to provide handles; and FIG. 9C is a diagrammatic perspective view of a hand-held version of the invention in which the batteries for powering it are contained in a pistol grip like handle.

DETAILED DESCRIPTION OF THE INVENTION

As already mentioned, the present invention provides embodiments of night vision apparatus that can either be arranged to be worn on the head or hand-held. Both types of embodiments share common elements but differ in the way they are supported as a user looks through them under low light level conditions. In general, the apparatus comprises a solid state imager sensitive to infrared radiation, means for generating infrared radiation within the spectral response range of the solid state imager, and directing this radiation into the field of view of the imager, and image generation means which receives the output from the imager and generates a visible image representative of the output of the image at a position visible to the person wearing the apparatus. Thus, in contrast to passive military night vision apparatus, the apparatus of the present invention is an "active" apparatus which generates the infrared radiation used to form the image. Since the scene being viewed by the user is being "illuminated" (in the infrared) by the apparatus itself, the apparatus of the present invention can use a solid state imager much less sensitive, and much less costly, than the image intensifier tube arrangement used in military night vision apparatus, The preferred form of solid state imager for use in the present invention is a complementary metal oxide semiconductors (CMOS) device, although other solid state imagers may also be used.

Figure 8:
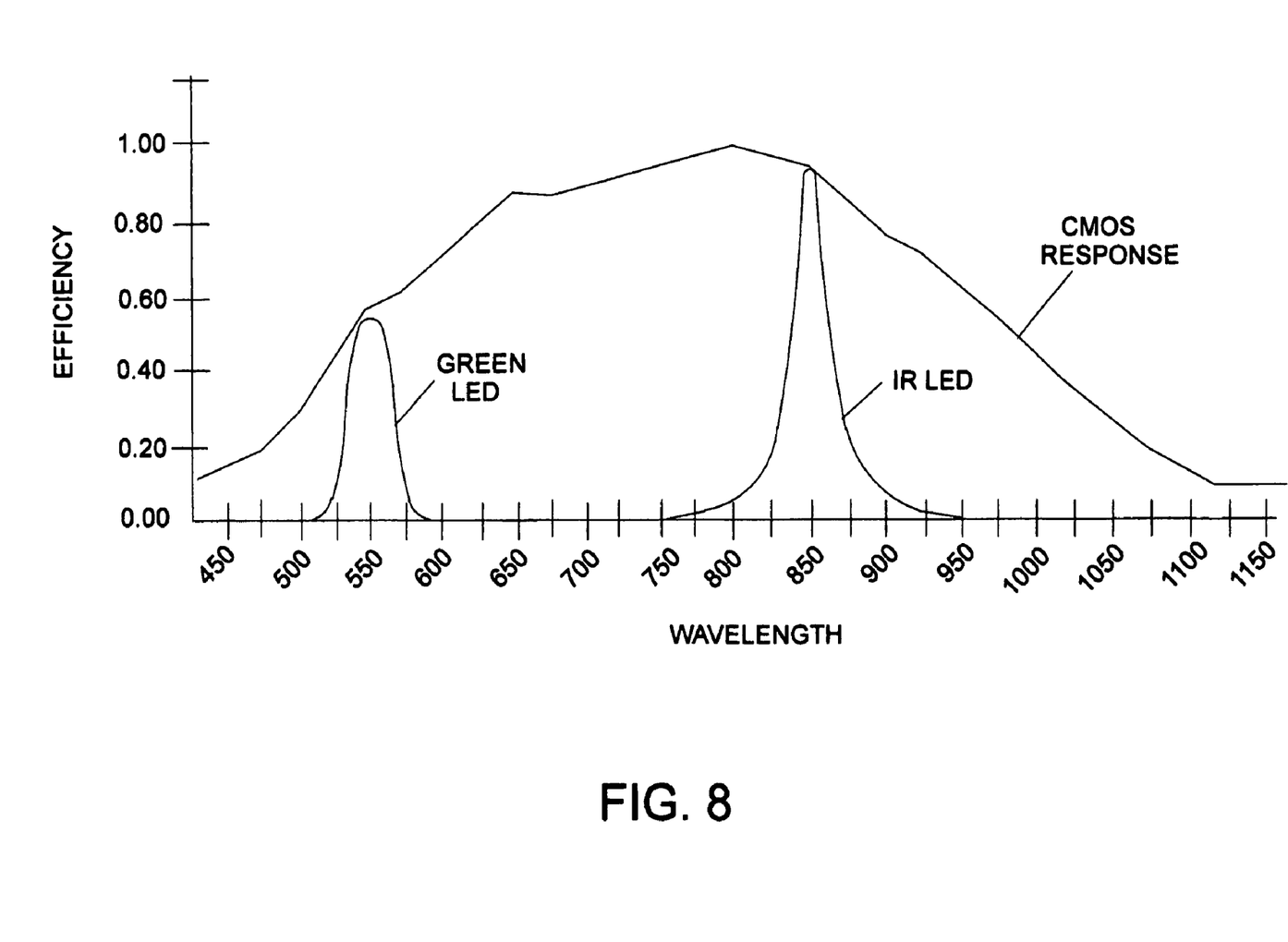
FIG. 8 is a graph showing the spectral response of the solid state imager shown in FIGS. 3 and 5 and the spectra of the emissions from the light emitting diodes shown in FIG. 6.

As discussed in more detail below with regard to FIG. 8, CMOS imagers are only sensitive to infrared radiation in the range of about 700 to 1000 (or in some case 1050–1075) nm. CMOS sensors are of course also sensitive to visible radiation of 400 to 700 nm, and in the present apparatus there is no particular reason to exclude visible light from the imager, i.e., the imager can be allowed to form an image using both the infrared radiation reflected from the scene viewed and any available ambient visible light. If a CMOS sensor is used in the present apparatus, the infrared radiation generation means is chosen to generate infrared radiation within the range of about 700 to 1000 nm to which the imager is particularly sensitive. Fortunately, inexpensive infrared radiation emitting diodes operating within this range are readily available commercially and are inexpensive. Operating in the 700 to 1000 nm range also has the advantage that the images generated using such near infrared radiation are much more similar to visible images than images formed using far infrared radiation with wavelengths of 2000 nm or more, and hence are easier for inexperienced users to interpret.

Figure 1:
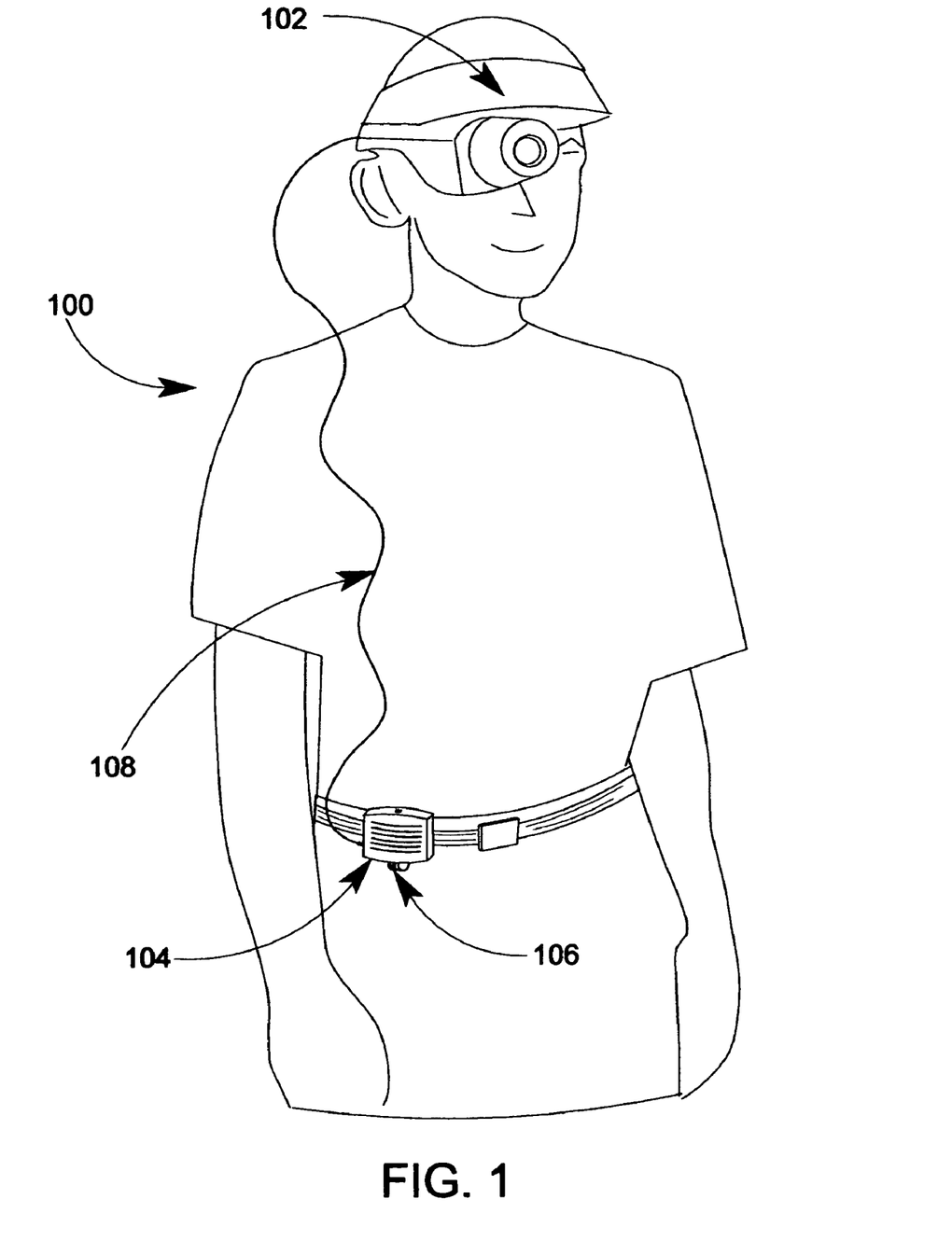
FIG. 1 is a three-quarter view, from in front and to one side of, a person wearing a night vision apparatus of the present invention.
Figure 2:
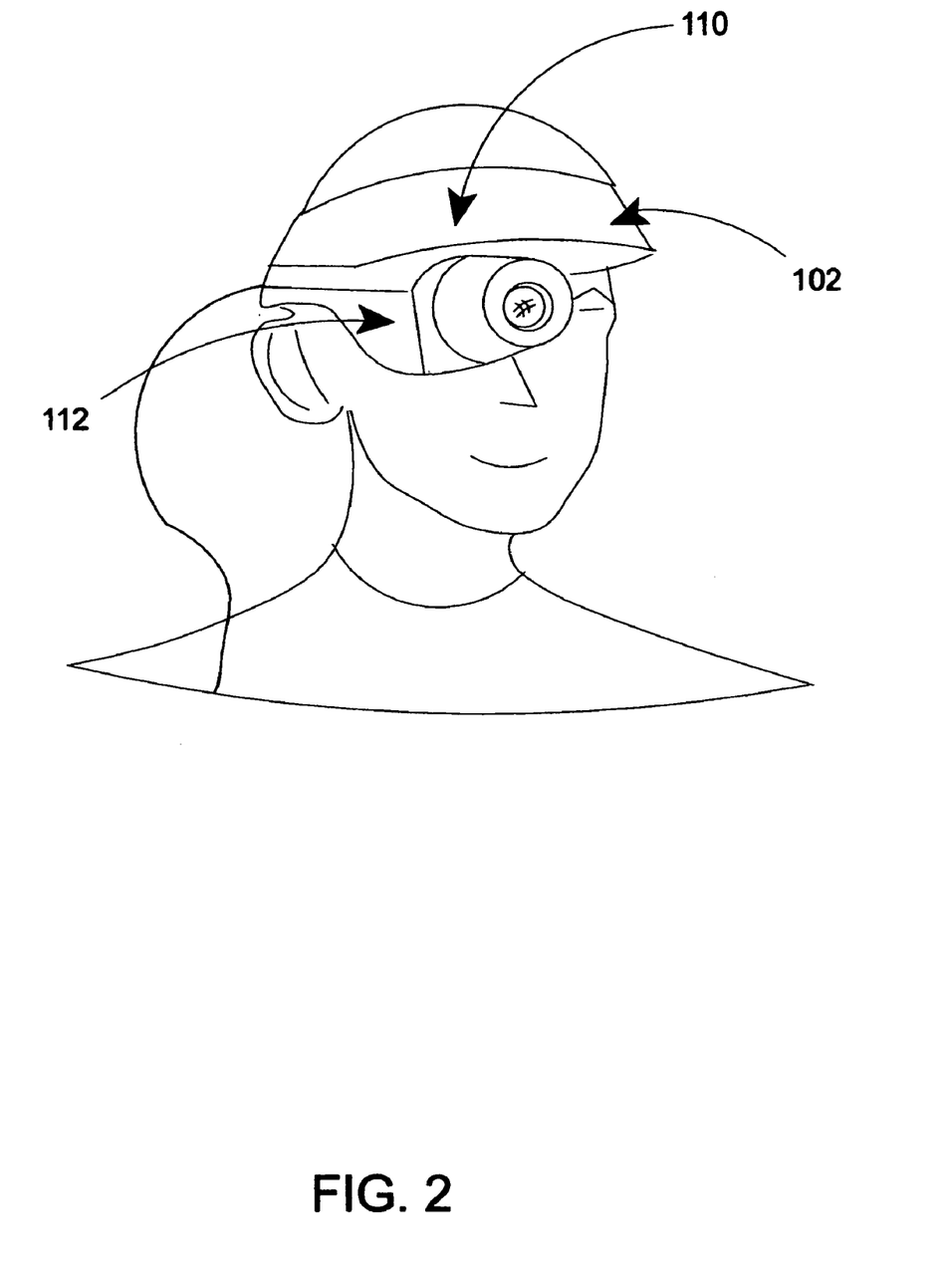
FIG. 2 is an enlarged three-quarter view, taken in the same direction as FIG. 1, of the head of the same person, showing the head-mounted unit of the night vision apparatus shown in FIG. 1.

FIGS. 1 and 2 show a preferred night vision head-worn apparatus (generally designated 100) of the present invention as it appears in use. As best seen in FIG. 1, the apparatus 100 has three main sections, namely a head-mounted unit 102 (hereinafter for convenience called the "head unit") worn on the head of the user, a battery pack 104 worn at the waist of the user and provided with a clip 106 by means of which it can be attached to the user's belt, and a connecting cable 108 extending from the battery pack 104 to the head unit 102 and supplying electric power to the electrical components of the head unit 102, as discussed in detail below.

Figure 3:
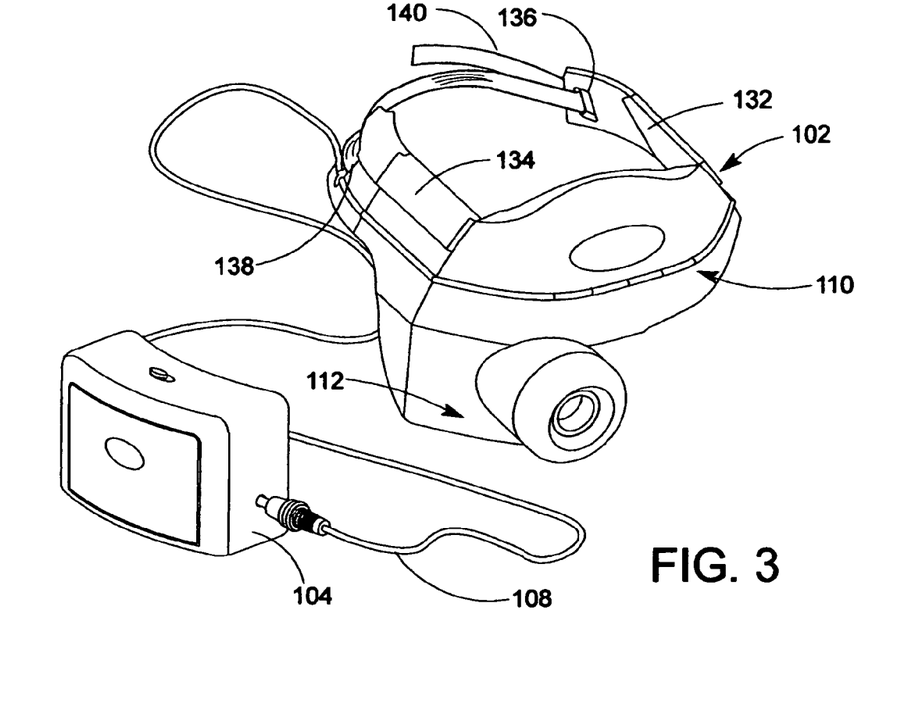
FIG. 3 is a diagrammatic perspective three-quarter view, from in front and to one side of, the night vision apparatus shown in FIGS. 1 and 2.

As best seen in FIGS. 2 and 3, the head unit 102 is worn on the head of the user in a manner substantially similar to that of a sun visor, with an upper section 110 extending across the brow and a lower section 112 supported by the upper section 110 and extending downwardly in front of one eye (the right eye is shown in the drawings, but obviously the left eye could be used) of the user. Thus, the head unit 102 provides monocular night vision for one eye. It should be noted that the head unit 102 is designed so that the eye not covered by the lower section 112 has its vision substantially unobstructed. This is a safety feature; the field of view of a typical solid state image sensor is rather narrow, and the eye covered by the lower section 112 is effectively deprived of its peripheral vision. Peripheral vision is important in avoiding obstacles and ensuring that a person walking does not accidentally fall over sudden drops, which may lie off to one side of the user's path. Since the apparatus of the present invention will typically be used in situations where there is at least some visible light present, keeping one eye of the user unobstructed allows the user to have at least some peripheral vision and thus helps to avoid collisions with obstacles and accidents due to falls etc.

Figure 4:
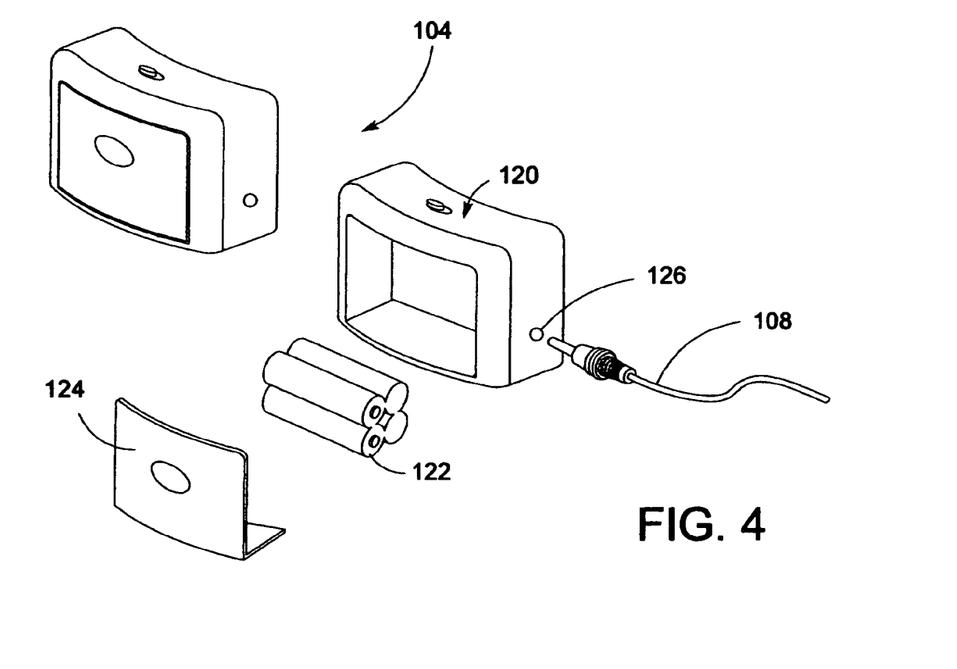
FIG. 4 is a diagrammatic exploded perspective view of the battery pack of the night vision apparatus shown in FIGS. 1 to 3.

As shown in FIG. 4, the battery pack 104 is of substantially conventional design having a main body 120 which is hollow and provides a large cavity into which are inserted four 1.5 V batteries 122 (AAs). A cover member 124 is releasably secured to the main body 120 by means of a screw (not shown), thus holding the batteries 122 in place within the main body 120. The main body 120 is also provided with an electrical receptacle 126 into which a plug 128, secured to one end of the cable 108, fits.

Figure 5:
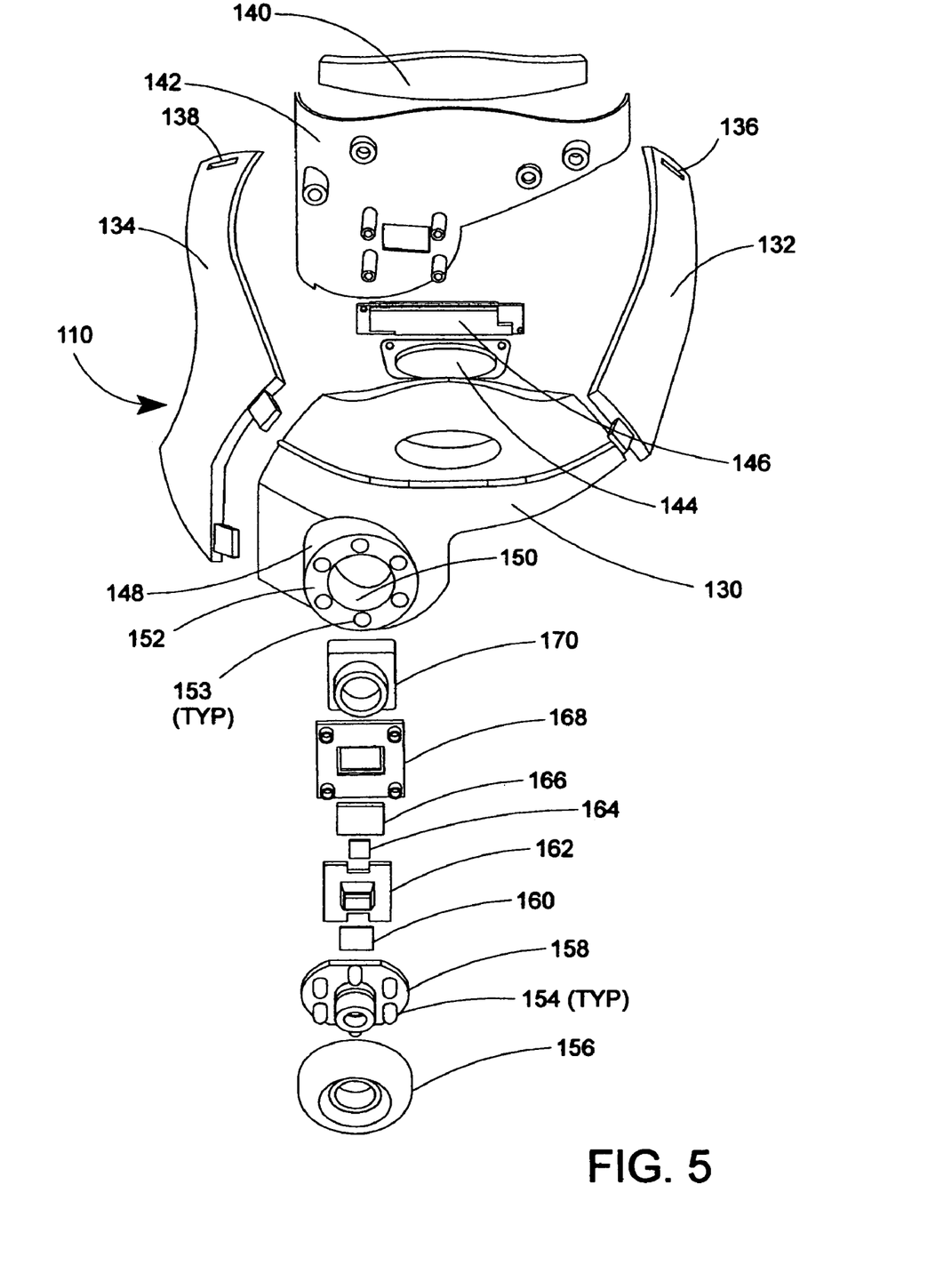
FIG. 5 is a diagrammatic exploded perspective view of the head-mounted unit shown in FIGS. 1, 2, and 3.

The detailed construction of the head unit 102 will now be described with reference to FIGS. 2, 3 and 5. As best seen in FIG. 5, the upper section 110 of the head unit 102 comprises a front support section 130 and left and right temple sections, 132 and 134, respectively, which are secured by hinges to the left and right edges, respectively, of front support section 130. At the rearward ends of the temples 132 and 134 are provided slots, 136 and 138, respectively (FIG. 3), and through these slots, 136 and 138, passes an adjustable flexible strap 140 of conventional design. A brow rest 142 (FIG. 5) lies adjacent and behind the front support section 130, and rests in contact with the user's brow. Two electronics modules 144 and 146, respectively, are held between the front support section 130 and the brow rest 142.

The lower section 112 of the head unit 102 includes a hollow, substantially cylindrical portion 148 which houses the imager sensor and associated parts of the unit. The front surface of the cylindrical portion 148 has a central aperture 150 surrounded by a flat annular surface 152 on which are formed six circular holes (typical at 153) through which extend six corresponding infrared radiation emitting diodes (typical at 154). Holes 153 are arranged at regular intervals on a circle centered on the center of the aperture 150. The diodes 154, which are incorporated in an objective lens assembly 158, are preferably of two different types, one having a narrow field of emission and the other having a substantially wider field of emission, with the two types alternating around the surface 152. It has been found that this arrangement of narrow angle and wide angle diodes, provides optimal illumination of the entire field of view of the image sensor (see below), the narrow angle diodes illuminating more distant objects while the wide angle diodes the closer objects. However, it will be recognized that one or the other can be used or used in different geometries and quantities consistent with the need to minimize the power consumption of the unit and hence the drain on the batteries 122.

A red filter 156 is mounted on the surface 152 and passes infrared and visible radiation having wavelengths greater than about 650 nm. The remaining optical and image-forming components of the head unit 102 are housed within the cylindrical portion 148 and are as follows:

(a) the objective lens assembly 158 which extends through aperture 150, also gathers infrared radiation, and images this radiation on to (b) a CMOS sensor 160 mounted on the lens assembly 158;

(c) a back-lighting unit 162 having the form of a green light-emitting diode (see below with reference to FIG. 6) combined with a scattering reflector;

(d) a diffuser 164 disposed adjacent the back-lighting unit 162 to diffuse light emitted from the back-lighting unit;

(e) a liquid crystal display 166 disposed adjacent the diffuser 164 so as to be backlit by light passing therethrough;

(f) a support plate 168 having a central aperture in which the display 166 is mounted; and (g) an eyepiece assembly 170 arranged to form an image of the display 166 immediately in front of the right eye of the user.

The mode of operation of the optical and imaging components 158–170 of the head unit 102 will now be explained with reference to FIGS. 6 and 7. As shown schematically in FIG. 6, the infrared diodes 154 emit infrared radiation which passes through the filter 156, is reflected from objects in front of the user, passes back through the aperture 150 and is imaged by a two-element micro video lens present in the objective lens assembly 158 on to the CMOS sensor 160. As shown in FIG. 7, the sensor 160 generates a standard RS170 video output signal which is fed to a monochrome video display driver housed within the electronics modules 144 and 146 (FIG. 5). The output from this driver is fed to the liquid crystal display 166.

Returning to FIG. 6, it will be seen that the back-lighting unit 162 comprises a green LED 172 lying within a frusto-conical cavity in a scattering reflector 174, the diffuser 164 lying across the wide end of the frusto-conical cavity. A green diode is chosen because this is the color to which the human eye is most sensitive, and hence which minimizes light output and power consumption for an image of any desired intensity. The combination of the scattering reflector 174 and the diffuser 164 provides a substantially uniform distribution of green light across the diffuser 164 and hence substantially uniform back-lighting of the display 166 disposed adjacent the diffuser 164. Green light passing through the display 166 is imaged by the two-element eyepiece assembly 170 to form an image visible to the right eye of the user.

Figure 6:
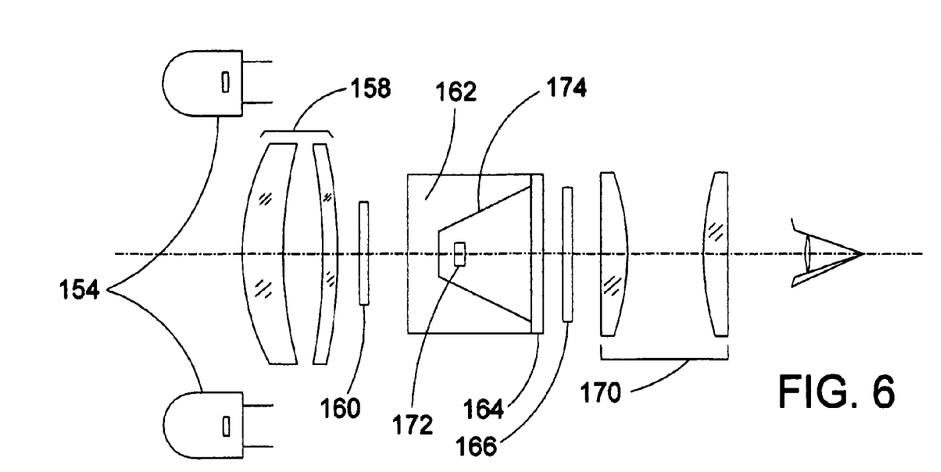
FIG. 6 is a schematic block diagram view of the optical and image-generating components of the head-mounted unit shown in FIGS. 1, 2, 3, and 5.
Figure 7:
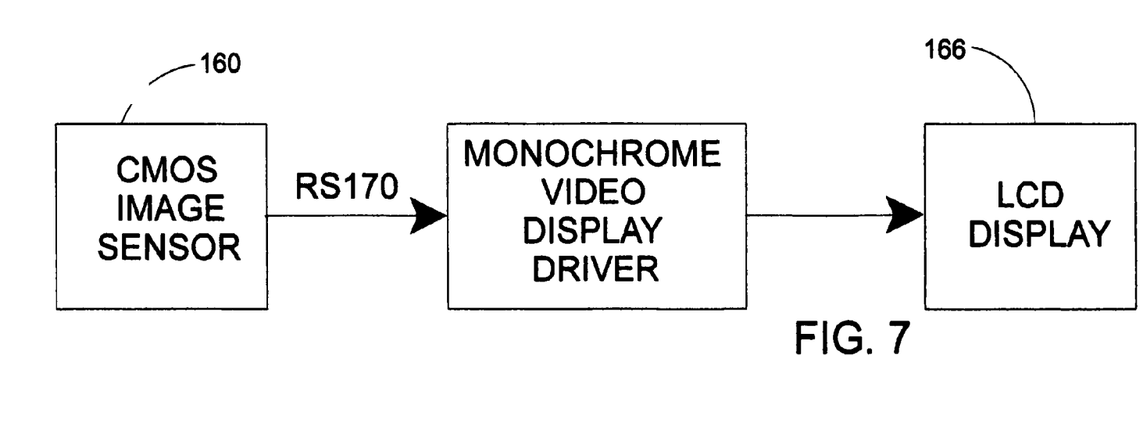
FIG. 7 is a block diagram showing image signals generated by the head-mounted unit shown in FIGS. 3 and 5.

The arrangement of optical and imaging components shown in FIGS. 5 and 6, in which the sensor 160 and the display 166 are substantially aligned along a common axis to provide for an extremely compact and convenient form factor. The arrangement is also designed to avoid two potential problems. As shown in FIG. 8, the infrared diodes 154 emit at around 850 nm, the green diode 172 emits around 575 nm, and the sensor 160 has substantial sensitivity over the range of about 475 to about 1075 nm. Accordingly, it is necessary to arrange the optical system so that no light from green diode 172 can reach the sensor 160, since the sensor would be affected by the green light and the desired infrared image would be degraded. The arrangement of the green diode 172 within the frusto-conical cavity of the reflector 174 and the mounting of the sensor 160 immediately adjacent the "back" surface of the reflector 174 (i.e., the surface facing away from the diffuser 164) prevent light from the green diode 172 reaching the. sensor 160. Also, for reasons already noted, it is undesirable for a night vision system to emit any visible light, and the filter 156 (FIG. 5) ensures that any light from the green diode 172 which may be reflected forwardly (i.e., away from the user), for example by reflection from the display 166, will not emerge from the head unit 102.

The preferred apparatus of the present invention shown in the accompanying drawings is simple, compact and can readily be manufactured using inexpensive, commercially available components. For example, the monochrome display driver can be a Motorola MCVVQ111 VirtuoVue driver, while the display 166 can be a Cyberdisplay 320 display, available from Kopin Corporation of Taunton Mass., with a 320×240 pixel output. The sensor 160 can be an OmniVision OV5116N CMOS sensor available from OmniVision Technologies, Inc., of Sunnyvale Calif., while the infrared diodes 154 can be Model RT-7507ET from Rodan (Taiwan) Ltd., and the green diode 174 can be a Kingbright Model AA3528 surface mount LED lamp. Using such components, bright images within the range from about 30 to 100 feet can be readily seen.

Figures 9A, 9B, 9C:
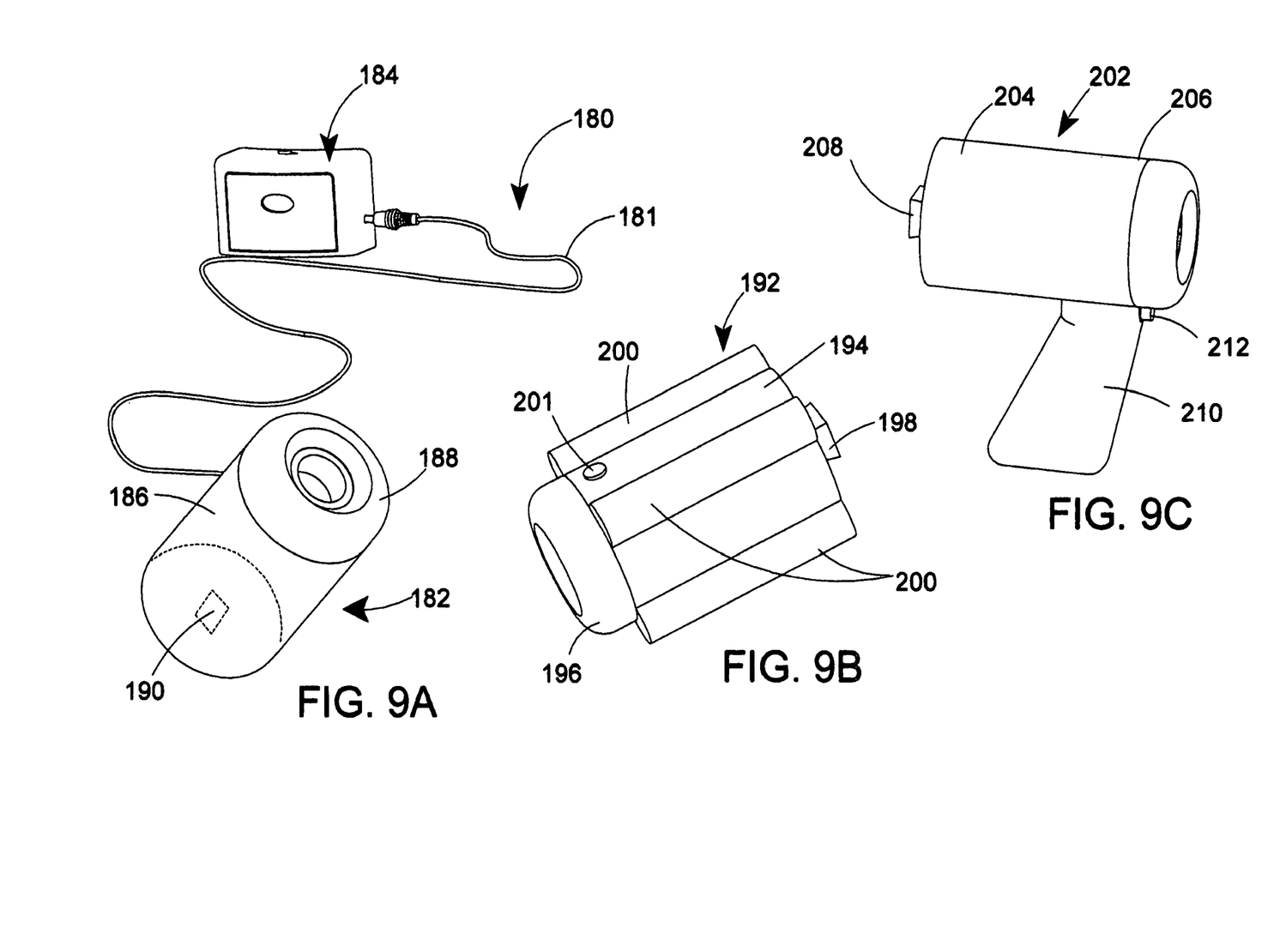

Reference is now made to FIG. 9A which shows a diagrammatic perspective of a hand-held embodiment of the invention. The hand-held embodiment, which is designated generally at 180, comprises two major assemblies. The first is a generally cylindrical shaped imaging assembly 182 that may be gripped by hand and a distant power pack 184 that carries batteries as before and is connected to the cylindrical housing via a cable 181 as before and is otherwise configured to be clipped on to a users belt of clothing. Imaging assembly 182 comprises a cylindrical shaped housing 186 having a forward section 188 that illuminates a scene, gathers light from it and images the light as before where the scene can be observed via an eyepiece at 190. In use, an observer simply places the eyepiece 190 next to her eye and turns the unit on.

Another hand-held embodiment is shown in diagrammatic perspective in FIG. 9B where it is designated genrally at 192. This hand-held embodiment differs from the prior one in that it has no distant battery pack. As seen in FIG. 9B, embodiment 192 comprises a generally cylindrical shaped housing 194 with a forward illumination and imaging section 196 and eyepiece 198 as before. A series of handles 200 are arranged around cylindrical housing 194 to serve as gripping surfaces and house batteries. To use embodiment 192, the observer turns the unit on by pressing a power switch 201 and places the eyepiece 198 adjacent his eye while aiming at a scene to be observed.

In FIG. 9C, another hand-held embodiment is shown in diagrammatic perspective where it is designated generally as unit 202 that comprises a cylindrical section 204 and pistol grip 210 in which batteries are housed. Cylindrical section 204, in turn comprises an illumination and imaging section 206 and an eyepiece 208. To operate unit 202, a user holds and aims it via pistol grip 210, turns the unit on by pressing a power button 212, and aims unit 202 at a scene of interest while observing through eyepiece 208.

It will readily be apparent to those skilled in the art that numerous changes and modifications can be made to the preferred embodiments of the invention described above without departing from the scope of the invention. For example, the CMOS sensor 160 could be replaced by another type of solid state imager, for example a charged coupled device. Also, the monocular embodiment described could be modified to a binocular model which forms images in front of both eyes of the user, although in this case it would be desirable to arrange for the image forming and display assemblies to be mounted on the head of the user so that they can be swiveled upwardly when not in use, since for reasons already explained it is undesirable for inexperienced users to walk around looking only through night vision apparatus. Therefore, it is intended that the embodiments described herein be considered as illustrative and not be construed in a limiting sense. From the foregoing, it will be seen that the present invention provides a night vision apparatus which is simple, inexpensive, compact, robust and well adapted for use by the general public, and which does not emit visible radiation and can thus permit observations can be made at night without disturbing animals with such visible light.

What is claimed is:

1. A night vision apparatus comprising:
   means for positioning the apparatus with a portion of the apparatus adjacent an eye of a user;
   a solid state imager mounted on said positioning means and having an operating mode having substantial sensitivity to infrared radiation, said solid state imager having a field of view;
   infrared radiation generation means mounted on said positioning means and arranged to generate infrared radiation and to direct such radiation into the field of view of said solid state imager; and
   image generation means mounted on said positioning means and arranged to receive an output from said solid state imager and to generate a visible image representative of said output at a position visible to the said eye of said user.

2. A night vision apparatus according to claim 1 wherein said solid state imager is a complementary metal oxide semiconductor device.

3. A night vision apparatus according to claim 1 wherein said solid state imager is sensitive to infrared radiation in the range of about 700 to about 1000 nm.

4. A night vision apparatus according to claim 1 wherein said solid state imager is also sensitive to visible radiation in the range of about 400 to about 700 nm.

5. A night vision apparatus according to claim 1 wherein said infrared radiation generation means comprises at least one infrared radiation emitting diode.

6. A night vision apparatus according to claim 5 wherein said infrared radiation generation means comprises at least two infrared light emitting diodes, at least one of said diodes being arranged to illuminate a wide area of the field of view of the solid state imager and at least one of said diodes being arranged to illuminate a narrower area adjacent the center of said field of view.

7. A night vision apparatus according to claim 5 further comprising a lens arranged to collect infrared radiation and to focus said radiation on said solid state imager, and wherein said infrared radiation generation means comprises at least three radiation emitting diodes arranged on a circle surrounding said lens.

8. A night vision apparatus according to claim 1 wherein said image generation means comprises a backlit liquid crystal display.

9. A night vision apparatus according to claim 8 wherein said liquid crystal display is mounted between said solid state imager and said user so that the backlight of said liquid crystal display is not visible except to said user.

10. A night vision apparatus according to claim 8 wherein the backlight of said liquid crystal display is provided by a light emitting diode and a diffuser is provided to diffuse the light from said diode across said liquid crystal display.

11. A night vision apparatus according to claim 10 wherein said light emitting diode emits green light.

12. A night vision apparatus according to claim 8 further comprising an eyepiece lens disposed adjacent said liquid crystal display, said eyepiece lens lying between said liquid crystal display and said eye of said user when said apparatus is being used.

13. A night vision apparatus according to claim 8 further comprising a filter arranged to filter any visible radiation emitted by said back light.

14. A night vision apparatus according to claim 1 wherein positioning means comprises head mounting means configured to permit said apparatus to be worn on a users head so that a portion of said apparatus is positioned adjacent one eye of the user and so as not to obstruct the eye of said user remote from said image generation means.

15. A night vision apparatus according to claim 1 wherein said positioning means is configured and arranged so that a user can manipulate said apparatus solely by hand.

16. A night vision apparatus according to claim 15 wherein said positioning means comprises a generally cylindrical shaped housing adapted to be manipulated by hand.

17. A night vision apparatus according to claim 16 further including hand grips attached to said generally cylindrical shaped housing to provide enhanced handling and house batteries

* * * * *